Jan. 19, 1943. R. H. BEEBE Re. 22,252

METHOD OF MAKING COILED COILS

Original Filed Aug. 22, 1933 2 Sheets-Sheet 1

INVENTOR
R. H. BEEBE.
BY M. F. Reges
ATTORNEY

Jan. 19, 1943. R. H. BEEBE Re. 22,252

METHOD OF MAKING COILED COILS

Original Filed Aug. 22, 1933 2 Sheets-Sheet 2

INVENTOR
R. H. BEEBE.
BY M. F. Rogue
ATTORNEY

Reissued Jan. 19, 1943

Re. 22,252

UNITED STATES PATENT OFFICE 22,252

METHOD OF MAKING COILED COILS

Raymond H. Beebe, Bridgeport, Conn., assignor, by mesne assignments, to Westinghouse Electric & Manufacturing Company, East Pittsburgh, Pa., a corporation of Pennsylvania Original No. 2,013,432, dated September 3, 1935, Serial No. 686,205, August 22, 1933. Application for reissue September 2, 1937, Serial No. 162,143

10 Claims. (Cl. 153—64)

This invention relates to the method of winding a helically wound wire into a secondary helix and, more particularly, to the manufacture of what may be termed a coiled-coil filament for incandescent electric lamps.

In the manufacture of incandescent electric lamps it is the practice to wind a wire, usually tungsten wire, into helical form and of sufficient length to provide the necessary resistance so that the coiled filament may constitute a light source upon the passage of electrical energy therethrough. Obviously, filaments for lamps of different wattages vary in the length, pitch and diameter of the coil.

Although a coiled lamp filament has been found practical to give satisfactory commercial results, it has been proposed to again coil the coiled filament to produce a light source having the shape of a helix, the turns of which are made of helically wound wire and consist of what may be termed primary and secondary coils.

It has been found that an incandescent lamp filament of the coiled-coil type consumes considerably less electric current, for a given light emission, than a straight filament, or one wound in a single helix having the same absolute length, and with the same current consumption, a coiled-coil filament has a higher light emission. This may be attributed to the mutual heating effect between separate sections of the turns of the filament lying close to one another. Furthermore, it has been found that when using a coiled-coil filament the relatively larger amount of light produced is confined to a comparatively small space. This is particularly true when the coiled-coil filament operates in a bulb having a filling of an inert gas.

It has also been found that, by the use of a filament or light source as above described, the mounting of the same is simplified in that a lesser number of support wires may be employed, thus reducing the material cost of the device.

Although the use of the coiled-coil type of filament has been heretofore proposed, certain difficulties existed in producing this type of filament, particularly in producing such coiled-coil filaments with the desired accuracy and at a cost comparable to the cost of other lamp parts.

In the incandescent electric lamp industry two methods are employed for the manufacture of the primary helically wound filaments. One method is to wind the refractory wire, which is usually tungsten, upon a mandrel of indefinite length, the mandrel-wound wire is then cut into sections of the proper length for use in lamps and placed in a bath which dissolves the mandrel but not the tungsten wire.

The other method of manufacturing helically-wound filaments consists in driving a tungsten wire into a cavity die so that it issues in the form of a helix in the absence of a mandrel. This latter practice, which is termed mandrelless winding is more clearly shown in Patent No. 1,670,499 issued May 22,1928.

In winding filaments on a machine of the mandrelless type it is possible to produce coiled sections at a high rate of speed and since the operation of removing a mandrel is eliminated, the cost of manufacturing is appreciably reduced.

By reason of the high rate of speed at which coils may be produced on the mandrelless coil winding machine and since no mandrel removing operation is required, it is desirable, when considering the manufacture of coiled-coil filaments, to provide a method of producing such filaments in connection with the mandrelless coil-winding method and the present method makes it possible to accomplish this end.

It is to be understood, however, that the present method, although shown and described herein as applied to the coiling of a coiled filament wire wherein the original coil was made on a mandrelless machine, is applicable to coils produced on a mandrel after the mandrel has been removed.

It is an object of the present invention, therefore, to provide a simple and effective method of helically coiling a helically coiled wire.

Another object of the invention is to provide a method whereby a filamentary wire may be wound to helical form, and the helix as formed, may be coiled into a second helix.

Another object of the invention is to provide means for forming a wire into a helix of a given pitch and in changing the space relation of the turns of the helix to produce a second helix.

Other objects and advantages of the invention will be understood from the following description together with the accompanying drawings, in which Fig. 1 is a fragmentary side elevational view of a machine for winding a helically coiled wire into a secondary helix and shows means for making the primary coil;

Figure 1:
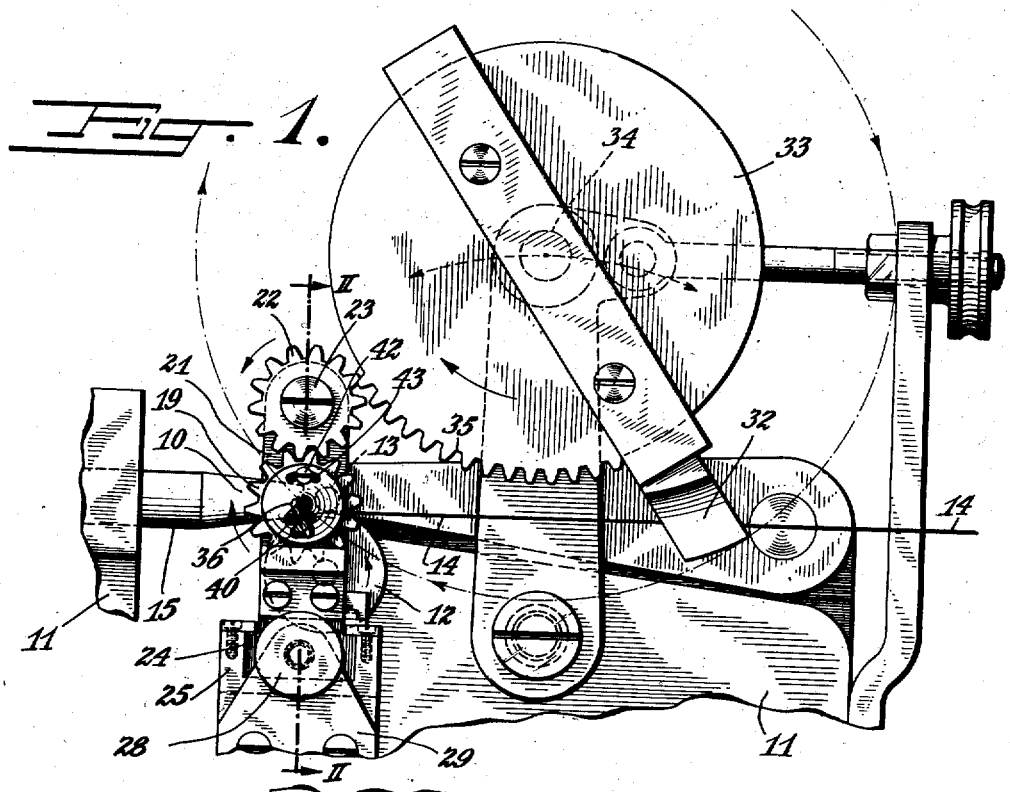
Figure 2:
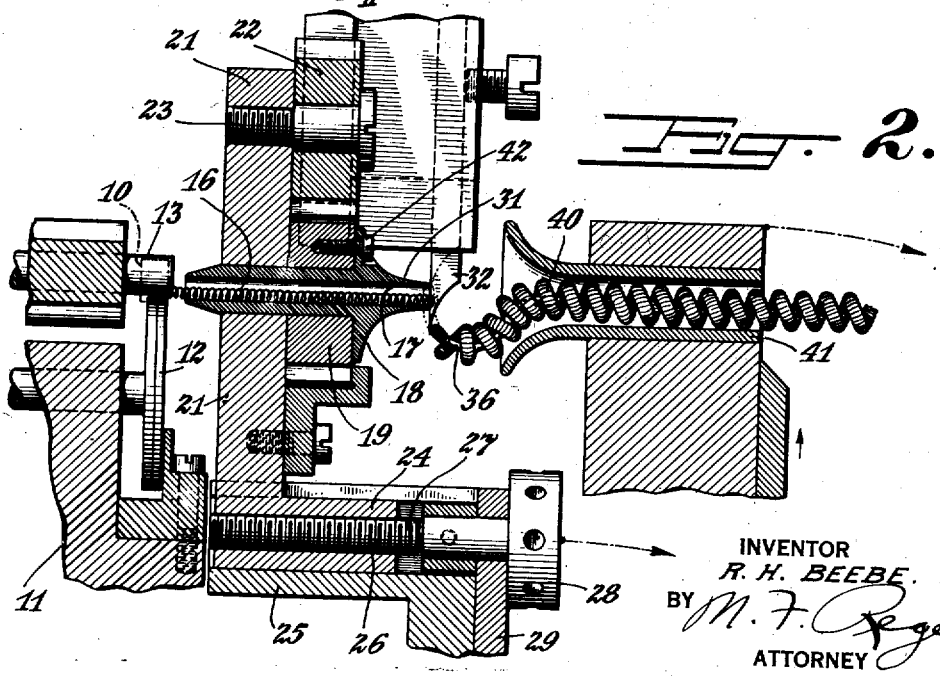
Fig. 2 is a view taken on line II—II in Fig. 1.
Figure 3:
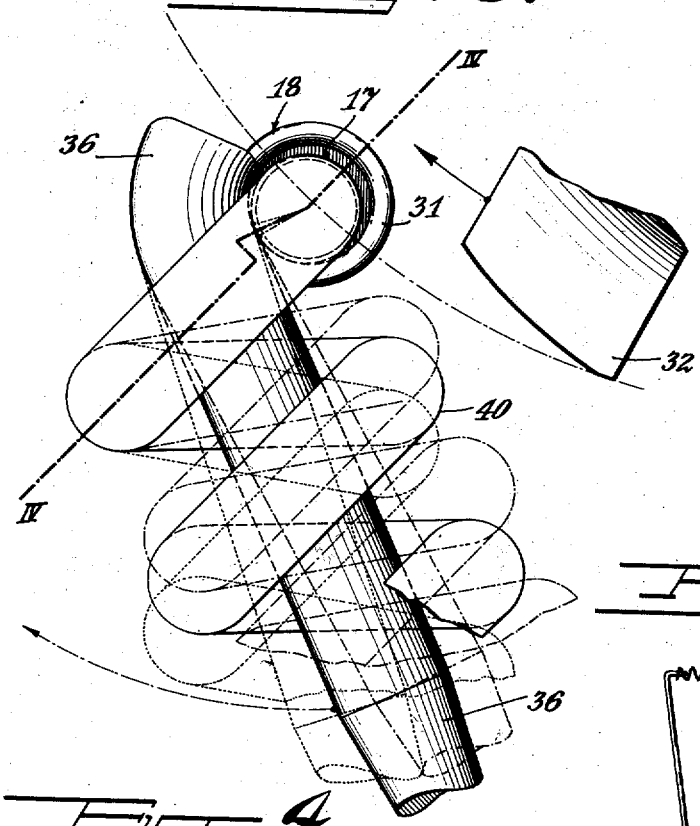
Fig. 3 is an enlarged diagrammatic view showing the relative positions of the primary coil and the spacer member for forming the primary coil into a secondary coil.
Figure 5:
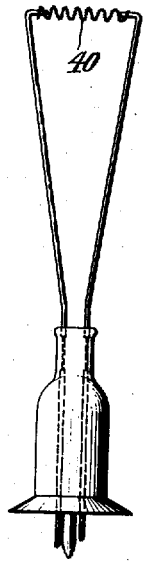
Fig. 5 shows a lamp stem including a coiled-coil filament.

Although the present invention may be practiced to coil a helically wound wire whether it is fed from a spool or other source of supply, it may also be utilized in connection with a mandrelless coil winding machine such as disclosed in the above mentioned Patent No. 1,670,499.

As illustrated the present machine may include a coil winding die 10 which is part of a mandrelless coil winding machine 11. The complete machine is clearly shown in the above mentioned patent and it is thought only necessary in the present drawings to show the force rollers 12 and 13 which drive a filament wire 14 into a die 10. The die 10 usually consists of a diamond mounted on a die rod 15. The diamond is provided with a concave cavity into which the filament wire 14 is thrust so that it issues in the form of a helix 16. This helix may, for the purpose of the present description, be considered as a primary coil. This coil, as it issues from the die, is led through a guide passage 17 formed in a sleeve 18 which sleeve constitutes a spindle for a pinion 19, the spindle being journaled in an adjustable standard or bracket 21. The pinion 19 is in mesh with a similar pinion 22 rotatable on a stud 23 secured in the bracket 21 which is provided with a foot piece 24 slidable in a guide support 25.

For the purpose of moving the bracket 21 to adjust it in a horizontal plane the foot piece 24 is provided with a threaded aperture 26 to receive a screw 27 the free end of which is provided with a head 28 which abuts against a plate 29 so that a rotation of the head 28 causing a rotation of the screw will serve to move the bracket 21.

When the helically wound filament or primary coil 16 travels through the passage 17 it rotates about the longitudinal axis of the helix, this rotation being caused by the mandrelless operation of coiling. The filament rotates at relatively high speed since in practice it is necessary to speed up the coiling operation to meet the rate of production of other lamp parts.

For the purpose of winding the primary coil into a secondary coil the sleeve 18 is provided with a nose piece 31 and it is at this point that the operation of forming the secondary coil is performed.

It has been found that if the turns of a helically wound coil of a given pitch are spread apart at predetermined points on the circumference of the coil that the helically wound coil will take the form of another helix. The present construction shows one means of operating on a primary coil to progressively move a member or spreader between successive turns of the coil.

When operating upon a helically wound coil as it issues from a coil winding machine and is thus rotating, it is necessary to provide means so coordinated and timed as to perform the spreading operation after each revolution of the primary coil so that the point at which the spreading takes place is always the same with respect to the circumference of the primary coil.

Figure 4:
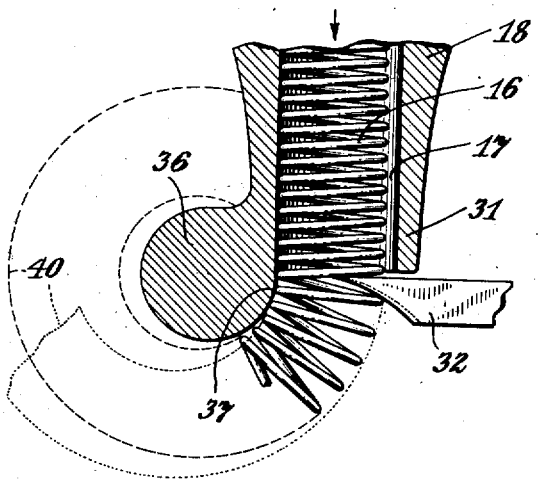
Fig. 4 is a view taken on line IV—IV in Fig. 3.

It has been found practical to perform the spreading operation by means of a knife-like member 32 which may be carried on a disc 33. The disc is rotatable on a shaft 34 driven by a suitable source of power (not shown). The disc 33 is provided with a toothed segment 35 disposed in mesh with the pinion 22. The segment and pinion are so proportioned and arranged that a movement of the segment will cause one complete rotation of the pinion. This will obviously cause a complete rotation of the pinion 19 and sleeve 18 which is rotatable therewith. Extending from the nose piece 31 of the sleeve is a guide finger or stub mandrel 36 and as the coil 16 issues from the sleeve it passes adjacent to and travels over an abutting surface 37 (see Fig. 4) on the mandrel 36. At this point a separator member or blade is moved between the turns. This blade is carried by the disc 33 and is so timed in its operation that with each complete rotation of the primary coil about its axis the blade enters between the turns. This operation is progressive and as each successive turn advances, the blade passes between it and the next succeeding turn. With the arrangement shown the points of separation for the turns will be in a straight line along its length.

As the blade operates to separate the turns, the primary coil begins to form a secondary coil 40 which is guided through a guide tube 41 and thence to means for cutting the coil into short sections for use as filaments for lamps. Means for cutting the secondary coil into sections may be the same as used for cutting up the mandrelless wound wire as shown in the above mentioned patent.

The mandrel 36 is, as above described, carried on the spindle 18 and therefore rotates with the primary coil so that the secondary coil as it is made will move with the primary coil and be held under control and fed into the guide tube 41. With the present construction the primary coil winding operation is terminated during the movement of the blade 32 between the turns. The operation of making the primary coil may, however, be made continuous by providing a plurality of blades 32 operating in timed relation to the rate of rectilinear movement of the primary coil.

It will be appreciated that the operation of the blade 32 must be timed accurately and in the present construction the disc 33 is adjustable to move the segment toward or away from the pinion 22 thus changing the pitch diameter and varying the degree of movement of the pinions and consequently the mandrel 36 on the nose piece 31. The nose piece is also slightly adjustable and is held against relative movement by a set screw 42 extending through a slot 43 in a flange on the sleeve 18. The sleeve and consequently the arbor is thus adjustable with respect to the path of movement of the blade 32 and by such adjustments the pitch of the secondary coil may be varied.

If the operation of making a secondary coil is to be performed on a helical primary coil fed from a source of supply as from a spool or if short lengths of coiled sections are to be again coiled it is obvious that the primary coil would not be rotating and it would therefore only be necessary to actuate the blades in a definite time relation to the rectilinear path of movement of the primary coil.

The blade 32 may be made of sharp knife-like form having a wedge shape. If the blade is so disposed that the edge of the knife just passes between the turns which are thus spread very slightly, a secondary coil of relatively large diameter will result. If the blade is moved so that it extends a greater distance into the coil to produce a greater spread, a secondary coil of small diameter will result. It will, therefore, be evident that by controlling the action of the spreader or knife, the diameter of the secondary coil may be controlled. The coil turn separator 32 is shown with a single blade but it is to be understood that the number of blades may vary and if desirable a plurality of blades may be used and operated to enter the space between each successive turn at the proper point about the circumference of the cylindrical primary coil.

When producing a light source in the form of a helically wound wire for a lamp of a given wattage certain conditions must be strictly observed. The length of the selected diameter filament wire contained in the light source must be exact so that the predetermined resistance will be obtained and this length of wire must be contained in a given number of turns, the pitch of the helix must be kept uniform and the outside diameter of the helix held constant.

The problem involved will be appreciated when it is understood that filament wire ranges from about one-half mil or less to about five mils in diameter. This filament wire is then wound into a helix having an outside diameter of about 40 mils or less.

It will be evident therefore, that when winding this helix into a secondary helix the dimensions are still extremely small, and, up to the present time, the only method known for making these fine coiled-coil finaments was to wind the primary filament on a mandrel, which was not only time consuming but did not give an article meeting all the requirements from a practical or operating standpoint.

As pointed out in the above mentioned patent, when winding a helical filament on a mandrelless machine, the wire is free from tensional stress as distinguished from the mandrel wound filament which is subjected to tensional stress during the winding operation.

When making a coiled-coil filament, therefore, it is desirable to utilize mandrelless wound filaments but it is also important to preserve the advantage gained by reason of the mandrelless winding. When the secondary winding is accomplished as heretofore proposed by winding the helix on a mandrel to produce the secondary coil, it is necessary to tightly wrap the primary coil on the mandrel. This results in a stretching or distortion of the wire and it is usually necessary to heat and thus soften the secondary coil to set it and prevent a change in diameter when the mandrel is removed. These operations tend to change the character of the wire and to some degree nillify the advantage gained by the mandrelless winding.

The present method makes it possible to produce a coiled-coil which is free from detrimental stress or strains which may tend to cause the final filament to sag when used as a light source.

In the present method the operation of separating to change the space relation between portions of adjacent turns at a given point, makes it possible to produce a secondary coil in the absence of any tensional force, thus giving a new article in the form of a coiled-coil which possesses properties not found in other coils of similar form made by other methods.

When mounting the usual type of lamp filament it is the practice to either clamp or weld the ends or terminals of the filament to the lead wires and the same practice may be followed with the present coiled-coil. When making a coiled-coil filament it has been found desirable to leave each filament with terminals consisting of short sections of the primary coil to facilitate the welding or clamping operation to secure the filament to lead or support wires. This may be accomplished by the present method in the following manner. The coil turn separator 32 may operate to produce a secondary coil of a given length. The operation of the separator may then be terminated and a given amount of the primary coil may be permitted to issue. The separator 32 may then again be put into operation and another secondary coil produced. This intermittent operation of the separator will then produce an indefinite length of filament composed of coiled-coil sections separated and connected by sections of the primary coil. The length of the sections of primary coil may be so proportioned that the coiled-coil portions may be separated by severing the primary coils midway between adjacent coiled-coil sections thus giving filamentary bodies to serve as light sources with terminals which facilitate the clamping or welding operation.

It is to be understood, however, that coiled-coil filaments may be used and are practical even without such terminals since the ends of the coiled-coils may be clamped or welded to support wires. In some cases the provision of terminals of the primary coil are desirable especially when coils of large diameter are used as in high wattage lamps.

It has been found that the present method makes it possible to produce coiled-coils of relatively large diameter. This is a decided advantage since when making coiled-coils by winding a primary coil on a mandrel as heretofore proposed it has been found that satisfactory results can be obtained only when making relatively small diameter coiled-coils.

In the present method which does not impose any tensional stress upon the wire, it has been found possible to wind coiled-coils having a wide range of diameters. A coiled-coil produced by the present method, as well as the method employed, constitute an advance step in the art of making incandescent lamps in that not only is it possible to save time and labor, but a better product is produced.

Although a preferred embodiment of the invention is shown and described herein it is to be understood that modifications may be made therein without departing from the spirit and scope of the invention as set forth in the appended claims.

I claim:

1. The method of making a coiled-coil filament which comprises moving a filament wire into a die to produce a helix and in applying a force against the turns of the issuing helix to produce a secondary helix.

2. The method of winding a secondary helix which comprises forming a primary coil by intermittently pushing a wire into a die to cause it to turn to helical form and intermittently rotate therefrom while moving axially along a predetermined path, and bending said helical coil by individually separating adjacent turns of the primary helix between said intermittent rotations thereof to provide a secondary coil.

3. The method of winding a secondary helix which comprises forming a primary coil by pushing a wire into a die to cause it to turn to helical form and intermittently rotate therefrom while moving axially along a predetermined path, and bending said wire by applying force between the individual helical turns during rest periods to change the space relation thereof to provide a secondary coil.

4. The method of winding a secondary helix which comprises intermittently pushing a wire into a die to cause it to turn to helical form and intermittently rotate therefrom while moving axially along a predetermined path, and applying force against the individual turns thereof between said periods of rotation to bend said primary coil into a secondary coil.

5. The method of making coiled coil filaments which comprises intermittently pushing a wire into a die to cause it to emerge therefrom in helical form and intermittently rotate while moving axially, and moving a member between the individual turns thereof between said periods of rotation to separate them to a greater extent on one side than on the other and cause the helical filament to form a secondary helix.

6. The method of winding a secondary helical coil which comprises forming a primary coil while causing it to intermittently rotate and advance axially along a predetermined path, and causing a separator element to wedge between the individual turns thereof between said periods of rotation, to form a secondary helix.

7. The method of forming a secondary helical coil which comprises pushing a wire intermittently into a cavity die to cause it to turn to helical form and emerge therefrom, while intermittently rotating as it advances step by step axially, and causing a separator element to move through a path substantially transverse to the longitudinal axis of said emerging helical wire and successively wedge between the individual turns thereof in sequence, while said coil is stationary between said intermittent rotations, to form a secondary helix.

8. The method of winding a secondary helical coil which comprises pushing a wire into a cavity die to cause it to intermittently turn to helical form and emerge from said die, and causing a separator element to successively pass between the turns of the helical coil while the latter is stationary, after emerging from said die, to bend said helical coil into a secondary helix, and intermittently interrupting the operation of said separator element while the primary coil is rotating from said die.

9. The method of winding a wire into a primary helix and then into a secondary helix, which comprises pushing said wire into a cavity die, causing it to emerge therefrom intermittently a turn at a time, as a primary helix and pass along a given path, and applying force between said periods of intermittent movement against the individual turns of said helix in sequence, to cause said primary helix to take the form of a secondary helix.

10. The method of making coiled coil filaments which comprises intermittently moving a filament wire into a die to successively produce individual turns of helical form, and individually separating said turns along one side between said intermittent movements, to cause the wire to take the shape of a secondary helix.

RAYMOND H. BEEBE.